United States Patent [19]

Hoffman, III et al.

[11] 3,968,192

[45] July 6, 1976

[54] METHOD OF REPAIRING LEAKY HOLLOW FIBER PERMEABILITY SEPARATORY DEVICES

[75] Inventors: Sargent Glenn Hoffman, III, Fresno; Frank Watkins Mather, III, Orinda, both of Calif.

[73] Assignee: The Dow Chemical Company, Midland, Mich.

[22] Filed: Apr. 19, 1974

[21] Appl. No.: 462,457

[52] U.S. Cl. .................................. 264/36; 156/94; 264/320; 264/322
[51] Int. Cl.² ........................................ B32B 35/00
[58] Field of Search ............. 264/36, 267, 320, 322; 165/11, 78; 138/97, 98; 156/94

[56] References Cited
UNITED STATES PATENTS

| | | | |
|---|---|---|---|
| 3,442,002 | 5/1969 | Geary, Jr. et al. | 264/36 X |
| 3,499,062 | 3/1970 | Geary, Jr. et al. | 264/36 |

*Primary Examiner*—Robert F. White
*Assistant Examiner*—Thomas P. Pavelko
*Attorney, Agent, or Firm*—Robert R. Stringham

[57] ABSTRACT

There is disclosed a method of repairing leaky permeability separatory devices, said devices comprising a membrane in the form of a multiplicity of hollow fibers having end portions potted in one or more resinous tubesheet bodies and terminating in an accessible surface of said tubesheet. According to the present invention, each surface opening communicating with a given leak in a tubesheet or fiber is selectively plugged by applying heat and pressure to the tubesheet and fiber material in the immediate vicinity of each such opening. The openings are first located by sealing the tubesheet/fiber assembly in an appropriately adapted jacket and applying pressure to a fluid in the portion of the jacket volume exterior to the fibers.

5 Claims, No Drawings

METHOD OF REPAIRING LEAKY HOLLOW FIBER PERMEABILITY SEPARATORY DEVICES

BACKGROUND OF THE INVENTION

Permeability separation devices in which the separatory membrane takes the form of a large number of hollow fiber lengths are now well known. Such devices are coming into widespread use for dialysis, blood oxygenation, ultrafiltration, reverse osmosis, separation of geseous mixures and the like. While considerable ingenuity has been exercised in developing efficient manufacturing processes such devices are generally expensive and produced only at relatively low rates.

In the case of biomedical devices, even very low rates of blood loss or contamination with foreign matter is intolerable. Thus, hollow fiber devices having even one leak per twenty thousand fibers are not acceptable for medical use. Unfortunately, it is generally not practicable to detect leaks or flaws conductive to leaking in the fibers before they are potted and fitted into a test assembly or final device. Furthermore, hollow fibers of a permeability requisite to operations such as blood dialysis or oygenation are generally fragile. Consequently, leaks may develop during assembly of even flaw-free fibers. It is then apparent, in the interests of economy, conservation of materials and device availability that a method of salvaging leaky units is highly desirable.

An effective method must provide for certain and facile location of leaks and for closing them off selectively, i.e., without also closing off access to a substantial proportion of the good fibers in the same area. The problem is complicated by the fact that permeability retention frequently requires maintaining the fibers in a wet or fluid-swollen condition until the device is put into use. A further complication is that only medically acceptable materials may be incorporated into devices, such as kidney and lung units, from which treated blood is returned to patients.

Among the prior art of interest, U.S. Pat. No. 3,499,602 teaches a method for repairing leaks in a fluid separation device comprising a fluid-tight tubular casing closed at either end by cast wall members, i.e., tubesheets, and having a plurality of hollow filaments extending between the members. With the casing oriented vertically, a solidifiable liquid is placed on the upper face of a tubesheet and is drawn into any leaks in that tubesheet and into any filament having leaks, by application of a pressure differential across the filament walls. The surplus liquid is then withdrawn and the liquid in the filled filaments or tubesheet channels is solidified.

SUMMARY OF THE INVENTION

The invention is a process for remedying leaks in an assembly comprising a plurality of hollow fiber lengths having end portions potted in and extending through a solid body of fusible resin (tubesheet) and opening upon an accessible surface of said tubesheet, said process comprising 1. disposing said assembly within a casing having at least one open end and adapted for connection to a fluid pressure source,
2. effecting a seal between said tubesheet and the portion of said casing adjacent said open end,
3. supplying a fluid under pressure to the volume within said casing exterior to said fiber lengths,
4. locating an opening in said accessible surface from which egress of said fluid occurs,
5. heating the assembly materials in the immediate vicinity of said opening, and
6. applying pressure to the heated materials with rod means.

The term "fusible resin" is intended herein to mean a resin which is thermoplastic or is thermally alterable to a composition which can be made to flow by application of pressure. The term "rod means" is intended to mean any solid article which is adapted to transmit mechanical, as distinguished from fluid, pressure to any one small portion of the accessible surface at a time.

Preferably the rod means also functions as the source of heat. That is, the rod means comprises a fine pointed, rigid heat conductor, such as a wire which retains adequate stiffness when heated. An electric soldering iron with a small diameter tip is particularly preferred.

One preferred embodiment of the invention includes marking the location of a leak-connected opening in the tubesheet surface with a needle-like article such as an ordinary straight pin.

In another preferred embodiment, the potted fiber ends make an angle of 45° or less with the tubesheet surface. This disposition of the fibers ends is particularly conducive to facile closing of openings connected with leaky fibers.

DETAILED DESCRIPTION OF THE INVENTION

The process of the invention is not limited in application to a completed permeability separatory device. Further, it is not a prerequisite for leak detection that the fibers be potted in situ, i.e., that the tubesheet is formed in sealing engagement with the casing in which the fiber bundle is to be diposed for the comtemplated end use. Leaks are preferably detected by mounting the fiber/tubesheet assembly in a suitably adapted casing and supplying a fluid under pressure between the fibers and casing, or jacket. The requisite sealing can be achieved by such means as resilient O-ring gaskets or by bonding of the potting resin to a jacket end-wall. The location of openings in each tubesheet surface communicating with leaks are observable either as points of egress of a visible fluid (a liquid, for example, and preferably with the tubesheet surface in a vertical plane), or of a gas (as a stream of bubbles in a body of liquid overlying a horizontal tubesheet surface).

The process of the present invention may suitably be applied (1) to fiber/tubesheet assemblies which have one or more than one tubesheet, (2) to assemblies in which the fiber lengths are in a concentric, crisscrossed or parallel configuration, (3) to assemblies in which the potted fiber ends are or are not perpendicular to the tubesheet surfaces(s) on which they open, (4) to assemblies in which the fiber lengths are open at one or at both ends and (5) to assemblies in which different ends of the fibers are potted in the same or different tubesheets. Genrically, then, the method of the present invention requires only that each leak in the assembly communicates with at least one opening in an accessible tubesheet surface. The process is practicable with potted fiber assemblies as described in each of the following patents:

| U.S. Pat. No. | Type of Assembly |
| --- | --- |
| 3,228,876 | A plurality of parallel hollow fiber |

| U.S. Pat. No. | Type of Assembly |
|---|---|
| | bundles, each end of each bundle potted in a separate ferrule; resin cut to open fiber ends. |
| 3,422,008 | Hollow fibers spirally wrapped on a rotating core, terminal portions potted in one or more radial tubesheets; resin cut to open fiber ends. |
| 3,475,331 | Hollow fibers wound around a wobbling and rotating core like a ball of kite string and terminal portions potted in an equatorial tubesheet; cut in half to open fiber ends. |
| 3,455,460 | Hollow fibers spirally wrapped on a rotating core and potted as arcuate lengths in one or more longitudinal tubesheets, routed-out to open fiber ends. |
| 3,546,209 | Hollow fibers wrapped into and potted at each end of jacket halves on periphery of wheel, fibers cut and two half units joined into cylindrical bundle with two tubesheets, resin cut to open fiber ends. |
| 3,755,034 | Hollow fibers wrapped around pair of advancing filaments and resulting ladder rolled up on core as tubesheet resin applied at one or more locations; resin cut to open fiber ends. |

The instant process is not limited to the repair of dry fiber/tubesheet asssemblies. The heating employed at the tubesheet surface is intense enough to provide localized drying and fusion even though the assembly materials are generally wet with water or another liquid.

Once the opening in a tubesheet surface communicating with a leak is located, it is preferably marked, as by insertion of a pin for example. In the preferred repair method, all such openings in a given surface are first located and then systematically closed by localized applications of heat progressively across the tubesheet surface. The requisite localized heat and pressure preferably is provided simultaneously, as by direct contacting of the assembly materials around an opening with a fine pointed, rigid heat conductor, such as a penciltype electric soldering iron. This is a very convenient method and permits accurate heat control. In a much less preferred method, heat and pressure are supplied by independent means, as by first heating with a laser beam or a hot gas stream and then applying pressure with a rod of a material which has a low thermal conductivity and is not readily wet by the heated assembly materials.

A hot, stiff wire can be used as an alternative form of soldering iron. This alternative is particularly useful for repair of units of the type described in U.S. Pat. No. 3,455,460, wherein the tubesheet surface is within a routedout channel or cavity. Openings in such surfaces are accessible to a wire having a bent tip, which may be guided with the aid of a dental mirror for instance.

The method of the invention is further not limited in application to thermoplastic assembly materials. It is also operable with thermoset materials which degrade upon heating to provide a composition which is flowable under pressure until cooled.

The temperature to which the assembly materials must be heated and the durations of heating and pressure application will of course depend on the composition of the materials to be contacted. These requirements are readily determined for any given fiber/tubesheet assembly by a few tests. The lowest temperature at which the material(s) soften or degrade at an appreciable rate is the lowest operable temperature. The maximum pressure duration required will depend on the resistance to flow at the minimum temperature but times of from 1 to about 15 seconds will usually be satisfactory.

It has been found that more than one application of heat and pressure can be made if necessary. For any routine manufacturing operation, adequate temperatures, pressures and application times for leak patching will have been established in advance. However, in the course of development work involving prototype or "one of a kind" units, a different set of conditions than anticipated may be necessary to remedy a given leak. Since such units usually represent a considerable investment, it is important not to have to discard them simply because a suitable temperature, contact pressure and/or time was not employed in the first patching attempt.

It will generally be required to retest any patched unit before it is passed as acceptable, particularly for medical applications. In those instances where a unit still leaks after patching, it can be recycled through the patching operation at least once before being rejected.

Some sort of test apparatus is required in order to examine a fiber/tubesheet assembly for leaks. The apparatus details depend upon the size and configuration of the assembly to be examined. In general, however, such an apparatus will comprise jacketing means, sealing means, pressurizing means and support means. The jacketing means and sealing means may be provided as part of an end product sub-assembly, as when a bundle of hollow fibers are end-potted in place within a jacket adapted for connection to a source of pressurized fluid. Alternatively, a pre-formed fiber/tubesheet assembly may be temporarily mounted in a test jacket and sealing effected by urging a peripheral portion of an outer face or wall of the tubesheet against a suitably supported gasket such as a resilient O-ring. The pressurizing means can be any source of pressurized fluid adapted to supply a gas or a liquid to the space between the jacket wall and the exterior surfaces of the fibers under a controlled pressure. Depending upon whether a liquid or gaseous fluid is employed, the jacketed fiber/tubesheet assembly is supported with the accessible surface, as discussed earlier herein, in a vertical or horizontal plane, by means of an appropriate stand, jig, clamp or vise. When the pressurizing fluid is a gas, a body of liquid is disposed over the tubesheet face so that the gas exiting at any openings which communicate with leaks can be observed as a stream of bubbles.

It is generally preferable to locate and mark all such openings before doing any repairs. Ordinary straight pins can be pushed a short distance into the tubesheet as a simple, readily removable marking means which is particularly appropriate when the fibers and/or tubesheet face are wet with a liquid. Other marking means, such as a pen with a fine felt tip, may be used instead of pins.

High pressures will not necessarily be required for leak location, particularly when a low viscosity pressurizing fluid is employed. However, it is ordinarily preferable to apply a pressure which is at least equal to the specified working pressure for the contemplated end-device. It will generally be preferable to pressure test the entire end-device (or at least a sub-assembly comprising the fibers, tubesheets, jacket, etc.) so that leaks in other locations, such as at fitting connections, can also be checked for and remedied by conventional methods.

The size of the iron-tip or wire employed to effect patching of an opening is not critical but certain factors require consideration. The smaller the diameter of the tip, the more accurately the location of the opening to be patched must be marked. On the other hand, the larger the tip, the more heat and pressure required and the larger the number of non-leaky fibers also closed off. The shape of the tip is also a factor; a rounded end wall generally have to be larger than a flat end. In practice, a 1/16" diameter, flat ended tip has been found quite suitable. For large fiber/resin assemblies, as in some current reverse osmosis modules, or where several leak-connected openings are closely grouped, a tip as large as 1/4" in diameter may be more practical.

It is preferred to dry the tubesheet face after locating the leaks and before patching. This is conveniently done with a warm air current. With some assembly materials, openings in wet surfaces can be closed even while the jacket contains a liquid under pressure.

SPECIFIC EMBODIMENTS

Each fiber/tubesheet assembly tested consisted of a hollow fiber bundle potted at each end in a 7×2-2½inch, transparent, plastic cylindrical jacket with enlarged endsections, said jacket having integrally molded inlet and outlet tubing connections. The open fiber ends terminated in planar tubesheet surfaces perpendicular to the axis of the cylinder and approximately flush with the cylinder ends. The enlarged end portions of the jackets included integrally molded threads so that inlet and outlet headers could be screwed on to provide communication with the fiber interiors in the end devices. The resulting sub-assembly was mounted in a holder with the tubesheet surfaces in either a vertical or horizontal plane, as noted in the numbered examples below. When the surfaces were oriented in vertical planes, water was run through the jacket around the outside surfaces of the fibers under the pressure noted. Pins were inserted in the tubesheet faces at each point of egress of water and the assembly drained. The surfaces were dried with warm air; the pins were removed, one at a time, and the tip of a pencil-type electric soldering iron pressed lightly against the material around the pin hole for about eight seconds. The iron was rated at 37.5–44 watts, had a tip temperature of 290°F. when operated under a potential of 105 volts and had a flat tip-end 2 mm in diameter. After all leaks had been patched, the assembly was repressured and rechecked for leaks.

When air was employed as the pressurizing fluid, the assembly was held with the tubesheet surfaces in horizontal planes. The uppermost surface was covered with water, conveniently dammed by a screw-on collar, and the points from which steady streams of bubbles emerged were marked with pins. The assembly was then rotated 180° and any leak-connected openings in the other tubesheet surface were located.

In fabricating the assemblies for the following tests, experimental, off-spec fibers were deliberately used.

EXAMPLE 1

A test cell of a type used for blood oxygenation was assembled from 25,000 lengths of 100μI.D. × 114μ O.D. hollow fibers composed of TPX, a polymer derived from a mixture of a minor amount of hexene-1 with 4-methylpentene-1 and purchased from Imperial Chemical Industries. The fibers were spirally disposed in criss-crossed layers around a hollow, 1 × 8 inch core, the core and fiber bundle placed in a 2½ O.D. × 8 inch jacket fitted with end molds and the bundle ends centrifugally potted with HYSOL-4056, a polyurethane. The fiber ends, resin and jacket ends were then machine cut to open the fiber ends, thereby providing "accessible" tubesheet surfaces. The "active" area of tubesheet surface including the open fiber ends was 21.8 cm$^2$ at each end. The fiber ends made a shallow, approximately 30° angle with the tubesheet surface.

With water passing through the jacket under a pressure of 7 psig, 3 leaks were discernible at one tubesheet surface immediately and 5 more were noted after a total pressurization time of 10 minutes. After marking, draining, and drying, patching was attempted. Six of the leaks were remedied on the first try, the seventh took two applications of heat and pressure, and the last required three attempts.

When the cell was rechecked under a water pressure of 11 psig, 3 more leaks at the first tubesheet were discernible and 2 at the second tubesheet. All of the latter leaks were patched in a single attempt.

EXAMPLE 2

A cell constructed essentially as in the preceding example contained 12,000 lengths of 200μI.D. × 250μ O.D. hollow fiber composed of a polycarbonate/siloxane copolymer potted with the same HYSOL-4056 resin. The active surface area at each tubesheet was 28.7 cm$^2$. Three leaks were detected at a jacket pressure of 7 psig and were patched successfully in one attempt.

EXAMPLE 3

A cell essentially as described in Example 1 but containing 40,336 lengths of TPX (100μ× 114μ) fiber terminating in 40.6 cm$^2$ of active surface at each tubesheet was assembled and pressurized with water at 7 psig. Eleven leaks were detected at each tubesheet and all 22 were repaired in one attempt.

EXAMPLE 4

A test cell of a type used for renal dialysis was assembled from 13,500 parallel, cellulose diacetate hollow fiber lengths, 200μI.D. × 250μ O.D. potted at each end in CONAP-2000, a polyurethane resin. The active surface area at each tubesheet face was 12.6 cm$^2$ and the O.D. of the jacket was 2 inches. The fiber ends were perpendicular to the tubesheet surfaces. The cell was pressurized in a vertical position with air as described above. Two leaks were detected at the uppermost tubesheet surface, which was covered with a layer of water. After water removal and drying, patching was attempted. It was found necessary to employ more heat than in the previous examples, since localized degradation of the CONAP was required. After several tries the leaks were successfully patched. Two leaks found at the other tubesheet surface in the same manner were also patched.

EXAMPLE 5

A cell essentially as described in Example 1 was fabricated with 5,288 hollow fiber lengths, 200μI.D. × 250μ O.D. The fibers consisted of Dow-Corning MDX-4-4222, an alphamethylstyrene/siloxane copolymer, and were potted at each end in HYSOL-4056 polyurethane. The active surface area at each tubesheet was 23.4 cm² and the angle between the fiber ends and tubesheet surfaces was about 30°. The cell was pressurized to 1 psig. Six leaks were detected at one tubesheet surface and five leaks at the other. All were successfully patched on the first attempt.

We claim:

1. A process for remedying leaks in a tubesheet/hollow fiber assembly comprising a plurality of hollow fiber lengths having end portions potted in and extending through a solid body of fusible resin and opening upon an accessible surface of said body, said process comprising
   1. disposing said assembly within an opening in a casing, said casing being adapted for connection to a fluid pressure source, in such manner that the accessible tubesheet surface is exposed,
   2. effecting a seal between the periphery of said tubesheet and the portion of said casing adjacent said opening,
   3. supplying a fluid under pressure to the volume within said casing exterior to said fiber lengths, thereby pressurizing said volume,
   4. locating an opening in said accessible surface from which egress of said fluid occurs,
   5. heating the assembly materials in the immediate vicinity of the opening in said accessible surface and applying pressure to the heated materials with rod means until said opening is sealed.

2. The process of claim 1 in which said rod means is a rigid, fine-pointed heat conductor and is employed to supply heat and pressure simultaneously to said assembly materials.

3. The process of claim 1 in which the location of a leak-connected opening is determined and then marked by insertion into the resin body of a readily removed, needle-like article.

4. The process of claim 3 in which the rod means is an electric soldering iron.

5. The process of claim 1 in which the potted fiber ends make an angle of 45° or less with said accessible surface.

* * * * *